(12) United States Patent
Shaw

(10) Patent No.: US 6,202,744 B1
(45) Date of Patent: Mar. 20, 2001

(54) OIL SEPARATION AND PUMPING SYSTEM AND APPARATUS

(75) Inventor: Christopher K. Shaw, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/187,887

(22) Filed: Nov. 6, 1998

Related U.S. Application Data

(60) Provisional application No. 60/064,696, filed on Nov. 7, 1997.

(51) Int. Cl.[7] ................................................ E21B 43/40
(52) U.S. Cl. ............................ 166/106; 166/105; 166/266
(58) Field of Search ................................. 166/266, 265, 166/105, 105.1, 105.3, 105.5, 106; 417/350, 572, 423.5, 424.1

(56) References Cited

U.S. PATENT DOCUMENTS

| | | |
|---|---|---|
| 2,242,166 | 5/1941 | Bennett . |
| 4,596,516 | 6/1986 | Scott et al. .............................. 417/58 |
| 4,746,423 * | 5/1988 | Moyer ................................... 210/104 |
| 4,749,034 | 6/1988 | Vandevier et al. ................... 166/105 |
| 4,766,957 | 8/1988 | McIntyre .............................. 166/265 |
| 4,913,630 | 4/1990 | Cotherman et al. . |
| 5,154,588 | 10/1992 | Freet et al. ......................... 417/423.3 |
| 5,159,977 | 11/1992 | Zabaras ............................... 166/105 |
| 5,173,022 | 12/1992 | Sango ................................. 415/169.1 |
| 5,335,732 | 8/1994 | McIntyre .............................. 166/313 |
| 5,425,416 | 6/1995 | Hammeke et al. ............... 166/105.5 |
| 5,579,838 | 12/1996 | Michael .............................. 166/106 |
| 5,730,871 | 3/1998 | Kennedy et al. ................ 210/512.2 |
| 5,842,520 | 12/1998 | Bolin .................................. 166/369 |
| 5,857,519 | 1/1999 | Bowlin et al. .................... 166/105.6 |
| 5,979,559 * | 9/1999 | Kennedy .............................. 166/369 |

FOREIGN PATENT DOCUMENTS

| | | |
|---|---|---|
| 0 322 958 A2 | 7/1989 | (EP) .............................. E21B/43/12 |

OTHER PUBLICATIONS

Pete Schrenkel, Robert Cox, Steve Kennedy and Bill Bowers; "Joint Industry Development of the Downhole Oil Water Separation System". (Not Dated).

B.R. Peachey and C.M. Matthews, "Downhole Oil/Water Separator Development";*The Journal of Canadian Petroleum Technology;* vol. 33, No. 7 (Sep. 1994).

"Downhole Oil/Water Separater Development Project", Paper C–FER, Nov. 1995.

* cited by examiner

*Primary Examiner*—David Bagnell
*Assistant Examiner*—Zakiya Walker
(74) *Attorney, Agent, or Firm*—Locke Liddell & Sapp LLP

(57) ABSTRACT

A system for separating fluids of differing densities includes a pair of pumps interconnected to and driven by a motor positioned therebetween. The pumps each have intake ends, distal second ends, and a pump intake proximal the intake end. The pumps, the motor, and a production tubing form a production string. A shroud is sealably connected to the production string at one end of the shroud at a position intermediate the motor and the pump intake of one of the pumps. The shroud surrounds the pump and extends at least partially over the pump. The shroud forms a fluid communication passageway between the pump and the shroud and an orifice at the end of the shroud opposite the sealed end to form an effective pump intake. A second shroud similar to the first shroud surrounds the other, second pump and is sealably attached to the production string intermediate the motor and the second pump. The effective pump intakes formed by the shrouds are at least sixty feet from one another.

6 Claims, 1 Drawing Sheet

OIL SEPARATION AND PUMPING SYSTEM AND APPARATUS

This application claims the benefit of U.S. Provisional Application Ser. No. 60/064,696, filed Nov. 7, 1997.

BACKGROUND OF THE INVENTION

Field of the Invention

The present invention relates to separation of fluids having different densities in production fluid streams from underground wells. More particularly, the present invention relates to an apparatus and system for moving the effective pump intakes of a dual pump downhole pump arrangement further from one another using a pair of shrouds surrounding the pumps to facilitate the separation of the fluids, namely water and oil.

BACKGROUND OF THE RELATED ART

Oil and water often exist in the same production zone. Additionally, water is often injected into a production zone to facilitate the flow of oil from the production zone and enhance production. During production of the oil, the oil and water must be separated. The separation may be accomplished in a number of ways such as by using hydrocyclones to separate the oil from the water. Another method allows the oil and water to settle in the casing and separate naturally and uses a pair of pumps, one of which is adapted and positioned to pump water and the other of which is adapted and positioned to pump oil. Typically, the clean water stream is then directed toward injection perforations in another potential production zone or another area of the current production zone.

To effectively produce the oil with the first, upper pump and water with the second, lower pump, the upper pump intake must be positioned above an oil-water interface and the lower pump must be positioned below the oil-water interface. Preferably, the distance between the intakes to the upper and lower pumps is as great as possible to maximize the retention time of the fluids within the casing to allow the fluids to naturally separate from one another due to their different densities. The longer the retention time of the oil and water in the casing before removal, the better the separation.

However, a single motor is typically positioned between the pumps and drives both of the pumps. Using a single motor to drive both of the pumps is advantageous because of the lower equipment cost of using only one motor and because only one power cable is required to power the pumps, as opposed to a two motor system that would require two power cables. However, a disadvantage of using a single motor to power both of the pumps is that the pumps and their intakes must be positioned relatively close together because the allowable space between the motor and the pumps is limited. Therefore, using a one motor system limits the separation of the upper and lower pump intakes from one another and from the oil-water interface and decreases the retention of the fluid in the casing prior to removal by the pumps. Thus, the downhole separation of the fluids using a system with two pump and a single motor is limited and the produced fluid may require substantial additional separation.

Accordingly, there is a need for an apparatus that permits the use of a single motor with a pair of pumps while providing for increased retention time of fluids in the well bore, a greater distance between the pump intakes and between the intakes and the oil-water interface and that provides for better separation of the fluids.

SUMMARY OF THE INVENTION

The present invention generally provides an apparatus for increasing the separation between the pump intakes of a pair of pumps driven by a single motor positioned between the pumps. In general, the apparatus is a fluid communication passageway extending from the pump intake of at least one of the pumps away from the other pump to form an effective pump intake that is further from the other pump. Preferably, each of the pump intakes are connected to a separate communication passageway. More particularly, the apparatus is a shroud surrounding the pump that is connected to the intake end of the pump and extends at least partially over the pump forming a communication passageway therebetween.

A casing that encloses the wellbore includes a production perforation through which production fluids enter. The production fluids typically comprise a mixture of oil and water that must be separated for the oil to be produced. Once in the casing, the differing relative densities of the fluids cause the fluids to separate and form an oil water interface with the oil floating on the water. The longer the fluids are allowed to remain in the casing before removal, the better the separation.

A production string is provided having a production tubing interconnected to a pair of pumps that are both driven by a single motor mounted between the pumps. Each pump includes an intake end, a second end, and an intake port through which the pump receives fluid. The pumps are preferably positioned so that one pump is above the oil-water interface and the other pump is below the oil-water interface and each pump pumps a separate fluid. The greater the distance between the pump intakes and the oil-water interface and between the two pump intakes, the longer the retention time of the fluid in the casing and the better the gravity separation. Preferably, this distance between the pump intakes is at least about sixty feet. However, because both pumps are connected to the same motor, the allowable separation of the pumps is limited.

To increase the effective separation between the pump intakes, the present invention provides at least one fluid communication passageway, having a first end and a second end, that extends from the pump intake of one of the pumps away from the other pump. The first end is proximal the pump intake and the second end is distal the pump intake and defines an inlet orifice. Preferably, the apparatus includes two fluid communication passageways each extending from the pump intake of a separate pump in diverging directions. The inlet orifices of the fluid communication passageways are preferably at least sixty feet from one another.

Another aspect of the invention provides a shroud surrounding one of the pair of pumps and defining an inner fluid passageway therebetween and an outer fluid passageway between the shroud and the casing. The shroud is sealably connected to the production string at a position between the motor and the pump intake of a first pump surrounded by the shroud and extends to a position beyond the pump intake. A second shroud similar to the first shroud surrounds a second pump and is sealably connected to the production string between the motor and the second pump. Preferably, the shrouds are connected to the intake ends of the pumps they surround. Additionally, the shrouds define inlet orifices at their second ends distal the first, sealed ends and the inlet ends of the shrouds are preferably at least about sixty feet from one another.

A further aspect of the invention is a system for separating fluids that incorporates the two pump, single motor design previously described with a shroud surrounding each of the pumps. The shrouds create effective pump intakes increasing the distance between the pump intakes, preferably to at least about sixty feet. This effective separation of the intake ports maximizes the retention time of fluids in the wellbore, thereby assisting and facilitating gravity separation of the fluids.

Another aspect of the invention provides a method for increasing the pump intakes of the pumps that comprises providing a communication passageway from the pump intake of at least one of the pumps that extends away from the other pump to a position distal the other pump. The preferred method provides a communication passageway for each of the pumps and the communication passageways are formed using shrouds that separate the pump intakes, preferably by at least about sixty feet.

An alternate embodiment provides a shroud for a system having two pumps that are each driven by a separate motor 50. The shrouds 70 facilitate separation of the effective pump intakes 66 from one another. Another alternate embodiment provides a shroud for a single pump driven by a single motor to provide an effective pump intake that is removed from the intake of the pump. Further, the shroud may be utilized to increase the flow of fluid over the pump motor to prevent the motor from overheating.

BRIEF DESCRIPTION OF THE DRAWINGS

So that the above recited features and advantages of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
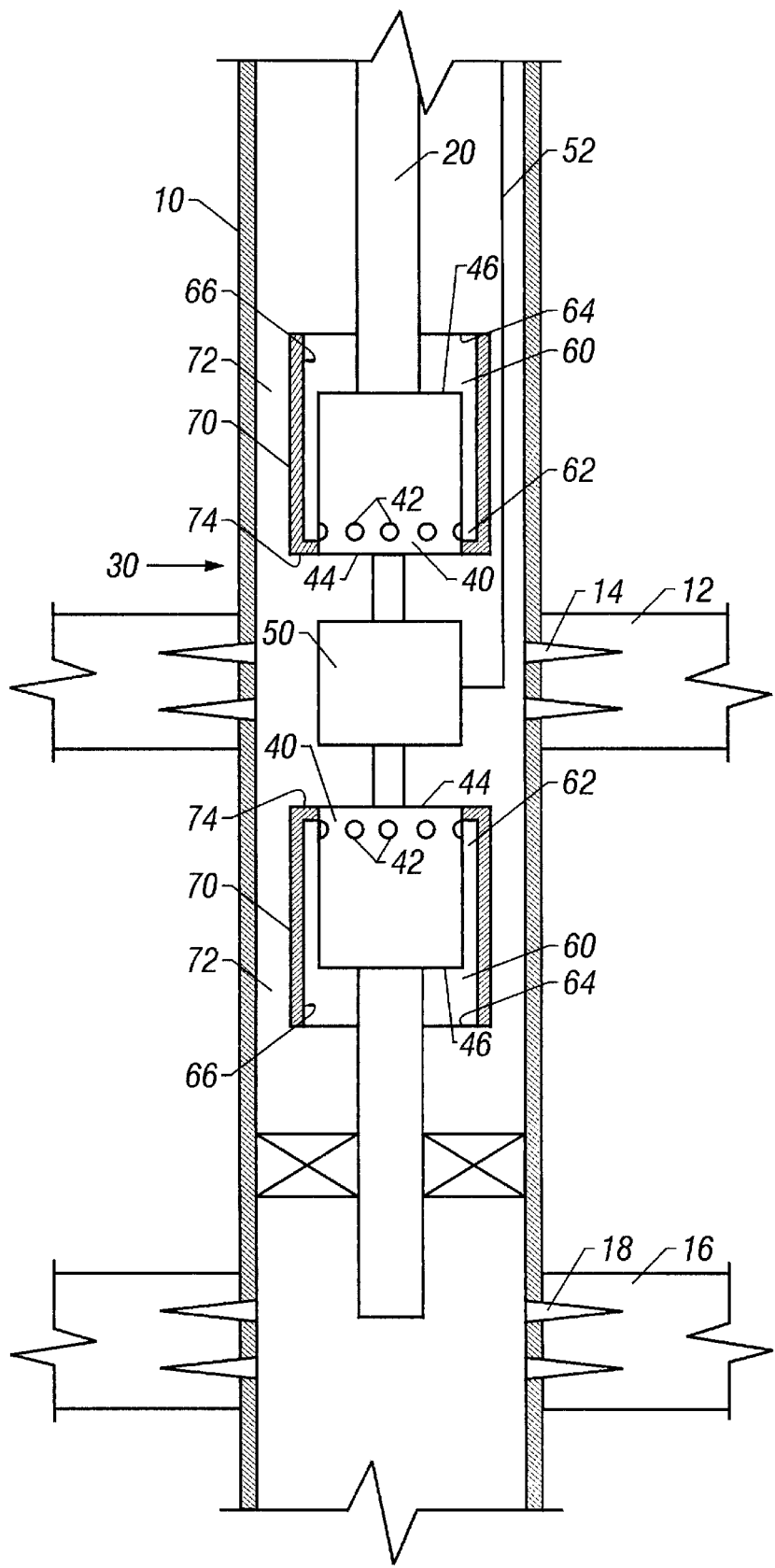
FIG. 1 is a partial cross section of a single motor/dual pump separator assembly having a pair of pump shrouds that increase the distance between the pump intakes.

The present invention generally provides an apparatus for increasing the effective separation between the pump intakes 42 of a pair of pumps 40 driven by a single motor 50 positioned between the pumps 40. In general, the apparatus provides a fluid communication passageway 60 extending from the pump intake 42 of at least one of the pumps 40 away from the other pump 40 to form an effective pump intake 42 that is further from the other pump 40. Preferably, both of the pumps 40 have a communication passageway 60 that moves the effective pump intakes 66 of each pump 40 away from one another. More particularly, the apparatus is a shroud 70 surrounding each pump 40, preferably connected to the intake end 44 of the pump 40, and extending at least partially over the pump 40 forming a communication passageway 60 between the pump and the shroud that leads to the intake.

Terms used in the description such as "up," "above," "upper," "upward," and so forth refer to positions located closer to the wellbore opening as measured along the wellbore. Conversely, terms such as "lower," "down," "below," "downward," and such are intended to refer to positions further away from the wellbore opening as measured along the wellbore.

A well used in the production of oil includes a casing 10. Zone 12 is an oil producing zone from which it is desired to remove production fluid through production perforations 14 in the well casing 10. Zone 16 is referred to as a disposal or injection zone into which it is desired to inject relatively clean water through injection perforations 18, perhaps for stimulation of hydrocarbons for later production. It is noted that the zones 12 and 16 may be two separate zones or they may be two locations within the same hydrocarbon zone. In the latter instance, water is typically injected into one of the locations with the purpose of urging hydrocarbons toward the other location.

Injection perforations 18 are disposed through the well casing 10 and into the disposal zone 16 and production perforations 14 extend through well casing 10 and into the producing zone 12. The wellbore casing 10 encloses the wellbore into which is suspended a string 30 of production tubing 20 which extends downwardly from the surface of the well. Fluid which is typically a mixture of oil and water flows from the producing zone 12 into the well casing 10 for production. For producing oil to the surface through the tubing, it is desirable to first separate the oil and water mixture to provide an oil-rich stream. The present application accomplishes the separation by retaining the oil and the water in the casing 10 sufficiently long to allow the fluids to separate naturally due to their differing relative densities and then pumping the fluids from the well.

To accomplish the removal of the fluids from the well, the production string 30 extending into the well includes the production tubing 20 and a pair of pumps 40 driven by a single motor 50 positioned between the pumps 40. The pumps 40 are typically high volume, low head pumps 40 of a type known in the art and include laterally spaced intake ports 42 into which a stream of fluid enters. Each of the pumps 40 has an intake end 44 and an opposite, second end 46. Intake ports 42 of each of the pumps 40 are typically positioned proximal the intake end 44 of the pump. Typically, the pumps 40 are constructed to mount to the motor 50 with the intake end facing the motor 50. The first, upper pump 40 is preferably positioned with the intake 42 above the oil-water interface for pumping of oil to the surface. The second, lower pump 40 is preferably positioned with the intake 42 below the oil-water interface for pumping of the water. In addition, the intake 42 of the upper pump 40 is preferably positioned in the well above the production perforations 14 and the intake 42 of the lower pump 40 is preferably positioned below the production perforations 14.

The motor 50 is attached to both of the pumps 40 and is preferably an electrical submersible motor of a type known in the art for operation of a pair of downhole pumps 40. A power cable 52 extends downward through the wellbore from the surface of the well to provide power to the motor 50. The motor 50 is positioned between the pumps 40 and is affixed to both of the pumps 40 so as to drive the pumps 40. An elastomer barrier seal may be incorporated with the motor 50 to help prevent well fluid from entering the motor 50 and to help equalize internal motor pressure with well annulus pressure.

Because both of the pumps 40 are connected to the same motor 50 they are ecessarily close to the motor 50 and to one another. Therefore, the intakes 42 of the two pumps 40 are relatively near one another. However, as mentioned, the preferred system provides pump intakes 42 that are as far as possible away from one another and the oil-water interface in order to increase the retention time of the fluid in the casing 10 to allow natural separation of the oil from the water. Preferably, the pump intakes 42 are at least about sixty feet from one another.

As shown in FIG. 1, the present invention increases the separation of the pump intakes 42 as well as the retention time of the fluid in the casing 10 by providing a fluid communication passageway 60 for each of the pumps 40 that has a first end 62 and a second end 64. The fluid communication passageway 60 extends from the pump intake 42 in a direction away from the other pump 40 to a position distal the other pump 40. The first end 62 of the fluid communication passageway 60 is positioned proximal the pump intake 42 and the second end 64 is positioned distal the pump intake 42. The second end 64 of the fluid communication passageway 60 defines an inlet orifice 66 that forms an effective pump intake 66 through which fluid may enter. Although in one design only one of the pumps 40 includes a fluid communication passageway 60, it is preferred that both of the pumps 40 include fluid communication passageways 60. The fluid communication passageways 60 effectively increase the separation of one pump intake 42 away from the fluid intake 42 of the other pump 40 to increase the gravity separation therebetween. Preferably, the effective pump intakes 66 are at least sixty feet from one another.

The preferred apparatus for providing the fluid communication passageway 60 for a pump 40 is to surround the pump 40 with a shroud 70. The shroud 70 has a tubular shape and is sealably connected to the production string 30, preferably at a position intermediate the motor 50 and the pump intake 42 of the pump 40 covered by the shroud 70. The opposite end of the shroud 70 is opened and forms a shroud inlet orifice 66 that allows fluid to flow therethrough. The inner diameter of the shroud 70 is greater than the outer diameter of the pump 40 to define an inner annular fluid communication passageway 60 therebetween through which fluid may flow. Similarly, the outer diameter of the shroud 70 is less than the inner diameter of the casing 10 to define an outer annular fluid passageway 72 that allows the flow of fluid around the shroud 70. The preferred attachment of the shroud 70 to the production string 30 is made by sealingly attaching, such as by welding or bolting, the flange 74 that is sealably joined to one end of the shroud 70 to the intake end of the pump 40. The tubular shroud 70 extends from the end flange over the pump 40 and, if necessary, beyond the pump 40. The end of the shroud 70 opposite the sealed end is opened and defines an effective pump intake 66, or inlet orifice, that is spaced from the pump intake 42. Consequently, the effective pump intake position may be adjusted to the desired position by lengthening the shroud 70. The longer the shroud 70, the further the effective pump intake is from the pump intake 42 and from the motor 50 and the other pump. Although the system may use a shroud 70 on only one of the pumps 40, the separation system preferably also uses a second shroud 70 surrounding the other pump 40 to move the effective pump intakes 66 of both of the pumps 40 away from one another. Preferably, the effective pump intakes 66 are at least about sixty feet from one another.

Although the preferred embodiment has been described in combination with a pair of pumps 40 driven by a single motor 50, it is anticipated that the present invention is equally applicable with a system wherein each of the pumps 40 is driven by a separate motor 50. In a system having two pumps 40, each driven by a separate motor 50, the shrouds 70 facilitate separation of the effective pump intakes 66 from one another. Likewise, it is anticipated that the shroud 70 may also be useful in a system having only a single pump 40 and a single motor 50 when it is necessary to provide an effective pump intake 66 that is removed from the intake 42 of the pump 40.

While the foregoing is directed to the preferred embodiment of the present invention, other and further embodiments of the invention may be devised without departing from the basic scope thereof, and the scope thereof is determined by the claims which follow.

What is claimed is:

1. An apparatus for downhole separation of oil and water from a wellbore, comprising:

(a) a first pump disposed above an oil/water interface in an oil zone of the wellbore and having an intake port in fluid communication with the wellbore and an outlet port in fluid communication with a first tubing that extends from the surface;

(b) a second pump disposed below an oil/water interface in water zone of the wellbore and having an intake port in fluid communication with the wellbore and an outlet conduit;

(c) at least one motor for driving the first and second pumps;

(d) a first shroud having a first end sealed between the first and second pump intake ports and a second end extending past the first pump intake port in a direction distal from the second pump; and (e) a second shroud having a first end sealed between the first and second pump intake ports and a second end extending past the second pump intake port in a direction distal from the first pump wherein the shrouds each define an intake zone surrounding the intake port of each pump and the intake zones are separated from each other.

2. The apparatus of claim 1, wherein the shrouds define inlet passages spaced at least about sixty feet from one another.

3. The apparatus of claim 1, wherein each shroud defines an inlet orifice about the respective pump.

4. A system for separating fluids of differing densities within a wellbore, comprising:

(a) upper and lower pumps, each pump having an intake end, an opposite second end, and a pump intake proximal the intake end;

(b) a motor interconnected and adapted to drive both the upper pump and the lower pump, the motor positioned between the upper pump and the lower pump;

(c) a first shroud surrounding at least a portion of the upper pump and defining a fluid passageway between the first shroud and the upper pump, the first shroud sealingly disposed between the motor and the pump intake of the upper pump and extending upward into an oil containing zone of the wellbore, wherein the first shroud defines an effective pump intake at a position above the pump intake of the upper pump, and (d) a second shroud surrounding at least a portion of the lower pump and defining a fluid passageway between the second shroud and the lower pump the second shroud sealingly attached to the production string at a position between the motor and the pump intake of the lower pump and extending downward into a water containing zone of the wellbore, wherein the second shroud defines an effective pump intake at a position below the pump intake of the lower pump wherein the fluid passageways of the shrouds are separated from each other.

5. The system of claim 4, wherein the effective pump intake of the first shroud is at least about sixty feet from the pump intake of the lower pump.

6. The system of claim 4, wherein the effective pump intake of the first shroud is at least about sixty feet from the effective pump intake of the second shroud.

* * * * *

UNITED STATES PATENT AND TRADEMARK OFFICE
CERTIFICATE OF CORRECTION

PATENT NO. : 6,202,744 B1
DATED : March 20, 2001
INVENTOR(S) : Shaw

It is certified that error appears in the above-identified patent and that said Letters Patent is hereby corrected as shown below:

<u>Claim 4,</u>
Line 50, after "lower pump" and before "the second" please insert -- , --.
Line 56, after "lower pump" insert -- , --.

Signed and Sealed this

Fifth Day of March, 2002

*Attest:*

*Attesting Officer*

JAMES E. ROGAN
*Director of the United States Patent and Trademark Office*